US007692683B2

(12) United States Patent
Kenoyer et al.

(10) Patent No.: US 7,692,683 B2
(45) Date of Patent: Apr. 6, 2010

(54) VIDEO CONFERENCING SYSTEM TRANSCODER

(75) Inventors: Michael L. Kenoyer, Austin, TX (US); Michael V. Jenkins, Buda, TX (US)

(73) Assignee: LifeSize Communications, Inc., Austin, TX (US)

( * ) Notice: Subject to any disclaimer, the term of this patent is extended or adjusted under 35 U.S.C. 154(b) by 1175 days.

(21) Appl. No.: 11/252,238

(22) Filed: Oct. 17, 2005

(65) Prior Publication Data

US 2006/0087553 A1 Apr. 27, 2006

Related U.S. Application Data

(60) Provisional application No. 60/619,210, filed on Oct. 15, 2004, provisional application No. 60/675,967, filed on Apr. 29, 2005.

(51) Int. Cl.
*H04N 7/14* (2006.01)
*H04Q 11/00* (2006.01)

(52) U.S. Cl. ............... 348/14.08; 348/14.12; 348/14.13

(58) Field of Classification Search ... 348/14.01–14.16; 370/260–261; 375/240.01, 240.12, 240.16, 375/240.24
See application file for complete search history.

(56) References Cited

U.S. PATENT DOCUMENTS

| 5,398,309 A | 3/1995 | Atkins et al. |
| 5,453,780 A | 9/1995 | Chen et al. |
| 5,473,363 A * | 12/1995 | Ng et al. ............... 348/14.09 |
| 5,528,740 A | 6/1996 | Hill et al. |
| 5,534,914 A | 7/1996 | Flohr et al. |
| 5,537,440 A | 7/1996 | Eyuboglu et al. |
| 5,572,248 A | 11/1996 | Allen et al. |
| 5,594,859 A | 1/1997 | Palmer et al. |
| 5,600,646 A | 2/1997 | Polomski |
| 5,617,539 A | 4/1997 | Ludwig et al. |
| 5,625,410 A | 4/1997 | Washino et al. |
| 5,629,736 A | 5/1997 | Haskell et al. |
| 5,640,543 A | 6/1997 | Farrell et al. |

(Continued)

OTHER PUBLICATIONS

"A history of video conferencing (VC) technology" http://web.archive.org/web/20030622161425/http://myhome.hanafos.com/~hsoonjp/vchx.html (web archive dated Jun. 22, 2003); 5 pages.

(Continued)

*Primary Examiner*—Melur Ramakrishnaiah
(74) *Attorney, Agent, or Firm*—Meyertons Hood Kivlin Kowert & Goetzel, P.C.; Jeffrey C. Hood

(57) ABSTRACT

In various embodiments, multiple participants (at endpoints) may connect through a video conferencing system. A screen may display other participants in the conference call. For example, multiple participants may be displayed in respective portions of the screen. In some embodiments, each of the participants may use video conferencing systems that support different resolutions. In some embodiments, a transcoder may resolution transcode signals to allow the conference call participants to be displayed on each participant's respective screen at up to the highest possible resolution supported by the respective screen. For example, low resolution video conferencing systems may be displayed on a high definition screen of a high resolution system at the low resolution of the low resolution video conferencing system while another image on the same high definition screen from a different, higher resolution video conferencing system, may be displayed at the higher resolution.

13 Claims, 15 Drawing Sheets

U.S. PATENT DOCUMENTS

| | | | |
|---|---|---|---|
| 5,649,055 | A | 7/1997 | Gupta et al. |
| 5,657,096 | A | 8/1997 | Lukacs |
| 5,684,527 | A | 11/1997 | Terui et al. |
| 5,689,641 | A | 11/1997 | Ludwig et al. |
| 5,719,951 | A | 2/1998 | Shackleton et al. |
| 5,737,011 | A | 4/1998 | Lukacs |
| 5,751,338 | A | 5/1998 | Ludwig, Jr. |
| 5,764,277 | A | 6/1998 | Loui et al. |
| 5,767,897 | A | 6/1998 | Howell |
| 5,812,789 | A | 9/1998 | Diaz et al. |
| 5,821,986 | A | 10/1998 | Yuan et al. |
| 5,831,666 | A | 11/1998 | Palmer et al. |
| 5,838,664 | A | 11/1998 | Polomski |
| 5,859,979 | A | 1/1999 | Tung et al. |
| 5,870,146 | A | 2/1999 | Zhu |
| 5,896,128 | A | 4/1999 | Boyer |
| 5,914,940 | A | 6/1999 | Fukuoka et al. |
| 5,995,608 | A | 11/1999 | Detampel, Jr. et al. |
| 6,038,532 | A | 3/2000 | Kane et al. |
| 6,043,844 | A | 3/2000 | Bist et al. |
| 6,049,694 | A | 4/2000 | Kassatly |
| 6,078,350 | A | 6/2000 | Davis |
| 6,101,480 | A | 8/2000 | Conmy et al. |
| 6,122,668 | A | 9/2000 | Teng et al. |
| 6,243,129 | B1 | 6/2001 | Deierling |
| 6,285,661 | B1 | 9/2001 | Zhu et al. |
| 6,288,740 | B1 | 9/2001 | Lai et al. |
| 6,292,204 | B1 | 9/2001 | Carleton et al. |
| 6,300,973 | B1 | 10/2001 | Feder et al. |
| 6,373,517 | B1 | 4/2002 | Davis et al. |
| 6,453,285 | B1 | 9/2002 | Anderson et al. |
| 6,480,823 | B1 | 11/2002 | Zhao et al. |
| 6,496,216 | B2 * | 12/2002 | Feder et al. .............. 348/14.09 |
| 6,526,099 | B1 | 2/2003 | Christopoulos et al. |
| 6,535,604 | B1 | 3/2003 | Provencal et al. |
| 6,564,380 | B1 | 5/2003 | Murphy |
| 6,594,688 | B2 | 7/2003 | Ludwig et al. |
| 6,603,501 | B1 | 8/2003 | Parry et al. |
| 6,646,997 | B1 | 11/2003 | Baxley et al. |
| 6,654,045 | B2 | 11/2003 | Allen et al. |
| 6,657,975 | B1 | 12/2003 | Baxley et al. |
| 6,677,979 | B1 * | 1/2004 | Westfield ................. 348/14.12 |
| 6,711,212 | B1 * | 3/2004 | Lin ....................... 375/240.24 |
| 6,728,221 | B1 | 4/2004 | Shaffer et al. |
| 6,744,460 | B1 | 6/2004 | Nimri et al. |
| 6,757,005 | B1 | 6/2004 | Elbaz et al. |
| 6,760,415 | B2 | 7/2004 | Beecroft |
| 6,816,904 | B1 | 11/2004 | Ludwig et al. |
| 7,089,285 | B1 | 8/2006 | Drell |
| 7,321,384 | B1 * | 1/2008 | Wu et al. ................. 348/14.08 |
| 2002/0188731 | A1 | 12/2002 | Potekhin et al. |
| 2003/0038807 | A1 * | 2/2003 | Demos et al. ............... 345/473 |
| 2003/0174146 | A1 | 9/2003 | Kenoyer |
| 2004/0183897 | A1 | 9/2004 | Kenoyer et al. |
| 2005/0012812 | A1 * | 1/2005 | Seo ......................... 348/14.09 |
| 2005/0259144 | A1 * | 11/2005 | Eshkoli ................... 348/14.07 |
| 2006/0013416 | A1 | 1/2006 | Truong et al. |

OTHER PUBLICATIONS

"MediaMax Operations Manual"; May 1992; 342 pages; VideoTelecom; Austin, TX.

"MultiMax Operations Manual"; Nov. 1992; 135 pages.; VideoTelecom; Austin, TX.

Ross Cutler, Yong Rui, Anoop Gupta, JJ Cadiz, Ivan Tashev, Li-Wei He, Alex Colburn, Zhengyou Zhang, Zicheng Liu and Steve Silverberg; "Distributed Meetings: A Meeting Capture and Broadcasting System"; Multimedia '02; Dec. 2002; 10 pages; Microsoft Research; Redmond, WA.

P. H. Down; "Introduction to Videoconferencing"; http://www.video.ja.net/intro/; 2001.

Louis C. Yun and David G. Messerschmitt; "Architectures for Multi-Source Multi-User Video Compositing"; 1993; 9 pages; University of California at Berkley, Berkley CA.

"Polycom VideoPlus Continuous Presence"; Brochure; 2004; 3 pages; Pleasanton, CA.

Peter Klein; "Video Workplace Conference"; IEEE Proceedings of Globecom; 1985; pp. 109-112; Siemens AG, Germany.

"Videoconferencing Educational Technology—Basic Functions of the Polycom Remote Control Unit"; http://www.medlib.iupui.edu/techsupport/vc/vcinstructions.html; 2002; 3 pages.

E. J. Addeo, A. D. Gelman and A. B. Dayao; "A Multi-media Multipoint Communication Services Capability for Broadband Networks"; Mar. 1987; pp. 423-428; Bell Communications Research; Morristown, NJ.

E. F. Brown, J. O. Limb and B. Prasada; "A Continuous Presence Video Conferencing System"; National Telecommunications Conference Record; Dec. 1978; 5 pages; vol. 1.

Armando Fox, Steven D. Gribble, Eric A. Brewer, and Elan Amir; "Adapting to Network and Client Variability via On-Demand Dynamic Distillation" Proceedings of the seventh international conference on Architectural support for programming languages and operating systems;1996; pp. 160-170.

Robert D. Gaglianello and Glenn L. Cash; "Montage: Continuous Presence Teleconferencing Utilizing Compressed Domain Video Bridging"; IEEE International Conference on Communication; Jun. 1995; pp. 572-581; AT&T Bell Laboratories.

A.B. Larsen and E.F. Brown; "'Continuous Presence' Video Conferencing at 1.5-6 Mb/sec"; Teleconferencing and Interactive Media, University of Wisconsin Extension Center for Interactive Programs; 1980; 8 pages.

Michael E. Lukacs; "The Personal Presence System—Hardware Architecture", Proceedings of the Second ACM International Conference on Multimedia; Oct. 1994; pp. 69-76; Bell Communications Research.

Shigeki Masaki, Hiroyuki Yamaguchi Hideya Ichihara and Kazunori Shimamura; "A Desktop Teleconferencing Terminal Based on B-ISDN: PMTC"; NTT Review; Jul. 1992; pp. 81-85; vol. 4, No. 4.

Shaker Sabri and Birendra Prasada; "Video Conferencing Systems"; Proceedings of the IEEE; Apr. 1985; pp. 671-688; vol. 74, Issue 4.

Christoph Weiss; "Desk Top Video Conferencing—An Important Feature of Future Visual Communications"; IEEE International Conference on Communications; Apr. 1990; pp. 134-139; vol. 1.

Marc H. Willebeek-Lemair and Zon-Yin Shae; "Videoconferencing over Packet-Based Networks" IEEE Journal on Selected Ares in Communications; Aug. 1997; 1101-1114; vol. 15, No. 6.

Elan Amir, Steven Mccanne, and Hui Zhang; "An Application Level Video Gateway"; In Proceedings of ACM Multimedia '95; 1995; 18 pages.

Horng-Dar Lin and David G. Messerschmitt; "Video Composition Methods and Their Semantics"; International Conference on Acoustics, Speech, and Signal Processing; Apr. 1991; pp. 2833-2836; vol. 4.

"Polycom Executive Collection"; Jun. 2003; 4 pages; Polycom, Inc.; Pleasanton, CA.

Joe Duran and Charlie Sauer; "Mainstream Videoconferencing—A Developer's Guide to Distance Multimedia"; Jan. 1997; pp. 50-52; Addison Wesley Longman, Inc.

* cited by examiner of the invention;

VIDEO CONFERENCING SYSTEM TRANSCODER

PRIORITY

This application claims priority to U.S. Provisional Patent Application, Ser. No. 60/619,210, titled "Video Conference Call System", which was filed Oct. 15, 2004, whose inventors are Michael J. Burkett, Ashish Goyal, Michael V. Jenkins, Michael L. Kenoyer, Craig B. Malloy, and Jonathan W. Tracey which is hereby incorporated by reference in its entirety as though fully and completely set forth herein.

This application further claims priority to U.S. Provisional Patent Application, Ser. No. 60/675,967, titled "Video Conferencing System Supporting Simultaneous High Definition and Standard Definition Video Conferencing and Bridging", which was filed Apr. 29, 2005, whose inventor is Michael L. Kenoyer which is hereby incorporated by reference in its entirety as though fully and completely set forth herein.

BACKGROUND OF THE INVENTION

1. Field of the Invention

The present invention relates generally to conference systems and, more specifically, to video conference systems.

2. Description of the Related Art

Video conferencing systems may allow multiple remote people to participate in a conference. Through video conference systems, participants may see the other participants in real time and may be able to visually interact with the other participants. Video conference systems also facilitate visual presentations to multiple remote sites.

Once connected, each video conferencing system with video capabilities may display multiple participants on one screen. However, the video conferencing systems may have to display images of the participants at the lowest supported resolution of all of the participants' video conferencing systems.

SUMMARY OF THE INVENTION

In various embodiments, multiple participants (at endpoints) may connect through video conferencing systems. A screen may display other participants in the conference call. For example, multiple participants may be displayed in respective portions of the screen. In some embodiments, two or more of the participants may use video conferencing systems that support different resolutions. For example, a first participant may have a video conferencing system that uses a resolution of 352×288 (pixels); a second participant may have a video conferencing system that uses a resolution of 1280× 720; a third participant may have a video conferencing system that uses a resolution of 848×480, and a fourth participant may have resolution of 720×576. Other resolutions are also contemplated. The video conferencing system may provide a transcoding algorithm and a bit rate algorithm to facilitate the call. In some embodiments, the video conferencing system may also support resolution transcoding to allow the conference call participants to be displayed on each participant's respective screen at up to the highest possible resolution supported by the respective screen. For example, low resolution video conferencing systems may be displayed on a high definition (HD) screen of a high resolution system at the low resolution of the low resolution video conferencing system while another image on the same high definition screen from a different, higher resolution video conferencing system, may be displayed at the higher resolution.

BRIEF DESCRIPTION OF THE DRAWINGS

A better understanding of the present invention may be obtained when the following detailed description is considered in conjunction with the following drawings, in which.

Figure 1:
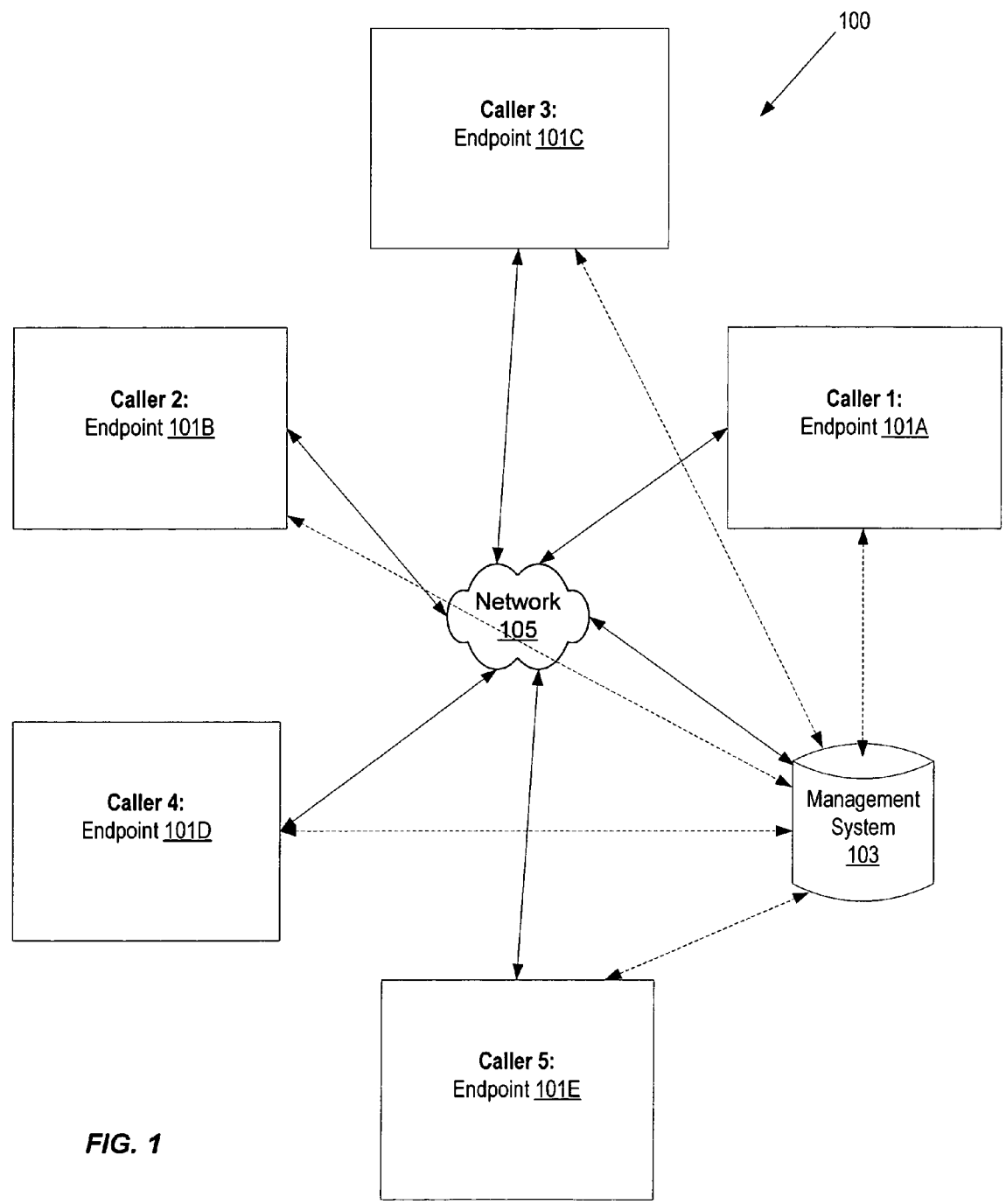
FIG. 1 illustrates a video conferencing network, according to an embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION OF THE EMBODIMENTS

Incorporation by Reference

U.S. Provisional Patent Application titled "Speakerphone", Ser. No. 60/619,303, which was filed Oct. 15, 2004, whose inventors are William V. Oxford, Michael L. Kenoyer, and Simon Dudley is hereby incorporated by reference in its entirety as though fully and completely set forth herein.

U.S. Provisional Patent Application titled "Speakerphone", Ser. No. 60/634,315 which was filed Dec. 8, 2004, whose inventors are William V. Oxford, Michael L. Kenoyer and Simon Dudley which is hereby incorporated by reference in its entirety as though fully and completely set forth herein.

U.S. Provisional Patent Application titled "Video Conferencing Speakerphone", Ser. No. 60/619,212, which was filed Oct. 15, 2004, whose inventors are Michael L. Kenoyer, Craig B. Malloy, and Wayne E. Mock is hereby incorporated by reference in its entirety as though fully and completely set forth herein.

U.S. Provisional Patent Application titled "High Definition Camera and Mount", Ser. No. 60/619,227, which was filed Oct. 15, 2004, whose inventors are Michael L. Kenoyer, Patrick D. Vanderwilt, Paul D. Frey, Paul Leslie Howard, Jonathan I. Kaplan, and Branko Lukic, is hereby incorporated by reference in its entirety as though fully and completely set forth herein.

FIG. 1 is a block diagram of a video conferencing system 100, according to an embodiment. In some embodiments, video conferencing system 100 may include a network 105, a management system 103 coupled to network 105, and endpoints or calling devices 101a-101e coupled to network 105. An endpoint 101 (including 101A-101E) may be coupled to network 105 in a wired or wireless fashion. Endpoint 101 (including 101A-101E) may include various wireless or wired communication devices, such as a wireless Ethernet (e.g., IEEE 802.11) card, paging logic, RF (radio frequency) communication logic, a wired Ethernet card, a modem, a digital subscriber line (DSL) device, a cable (television) modem, an Integrated Services Digital Network (ISDN) device, an ATM (asynchronous transfer mode) device, a parallel or serial port bus interface, and/or other type of communication device.

In various embodiments, network 105 may include and/or be coupled to other types of communications networks, such as a public switched telephone network (PSTN), where endpoints 101 may send and receive information from/to the PSTN or other communication networks. In some embodiments, network 105 thus may be, or be coupled to, any of various wide area networks (WANs), local area networks (LANs), and/or corporate networks, including the Internet. In some embodiments, endpoints 101, network 105, and/or management system 103 may use one or more secure methods and/or secure techniques for communication.

Network 105 may include one or more wireless networks, e.g., based on IEEE 802.11 and/or IEEE 802.16. Network 105 may include one or more wireless networks, e.g., based on Ethernet, DSL (digital subscriber line) and/or cable (e.g., cable television) networks and/or infrastructures. For example, network 105 may include one or more of: cable modems, cable modem termination systems (CMTSs), satellite modems, DSL modems, digital subscriber line access multiplexers (DSLAMs), broadband remote access servers (BRASs), and/or metropolitan area networks (MANs), among others. Network 105 may form part of the Internet, or may couple to other networks, e.g., other local or wide area networks, such as the Internet. Thus, endpoints 101A-101E and/or management system 103 may be coupled together using a PSTN, e.g., Ethernet cable and DSL or Ethernet cable and ISDN; a cable (television) based network; a satellite-based system; and/or a fiber based network; among others.

Figure 2:
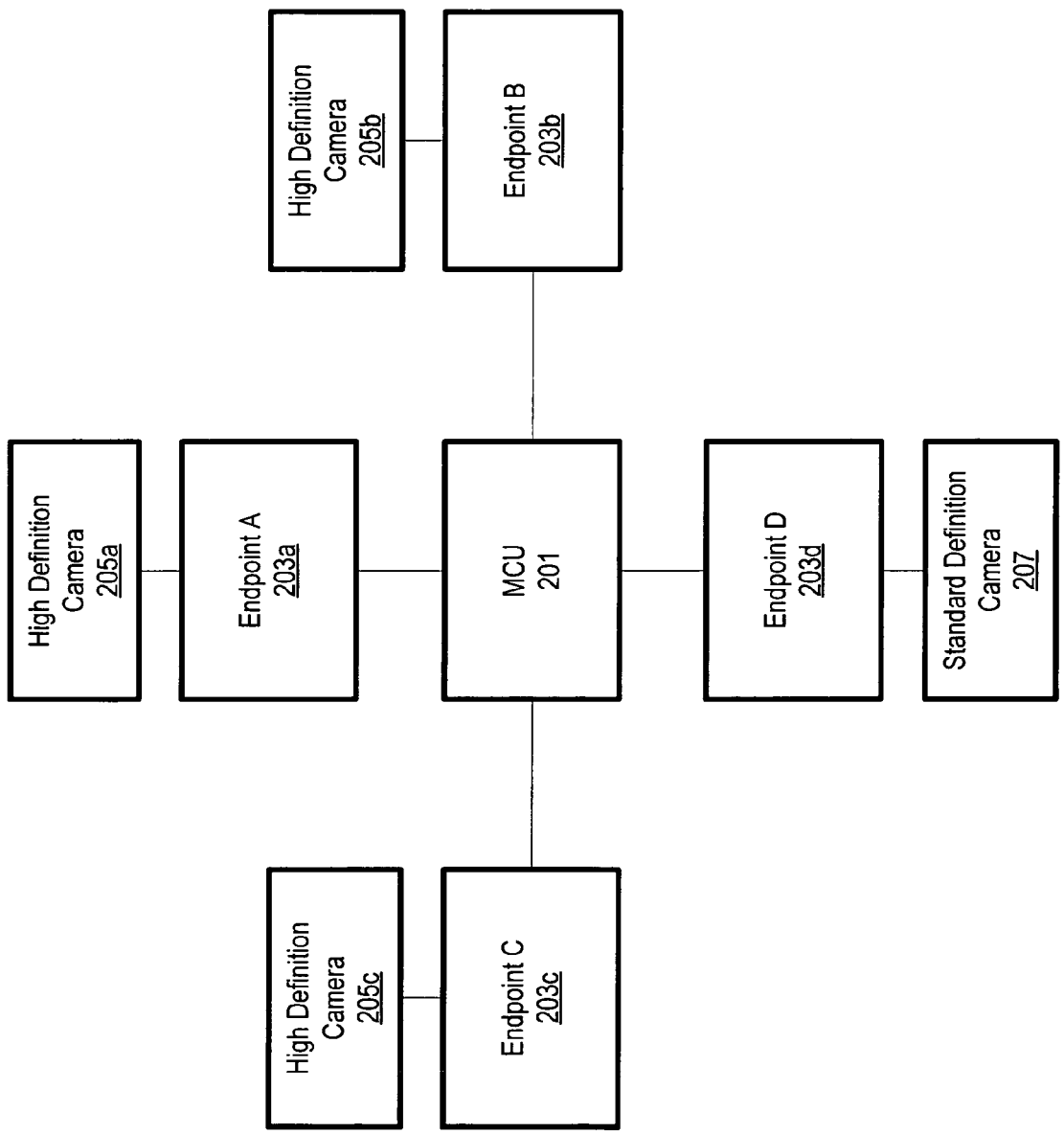
FIG. 2 illustrates multiple endpoints supporting various resolutions coupled to a Multipoint Control Unit (MCU), according to an embodiment.

FIG. 2 illustrates an embodiment of multiple endpoints supporting various resolutions coupled to a Multipoint Control Unit (MCU) 201. In some embodiments, video conferencing endpoints 203a-203c may transmit high resolution images captured through their high definition cameras 205a-205c. In some embodiments, one or more lower resolution endpoints (e.g., endpoint 203d) with, for example, a standard definition camera 207 may also be coupled to the MCU 201. In some embodiments, the MCU 201 may be a separate device or may be embedded in one of the video conferencing endpoints.

Figure 3:
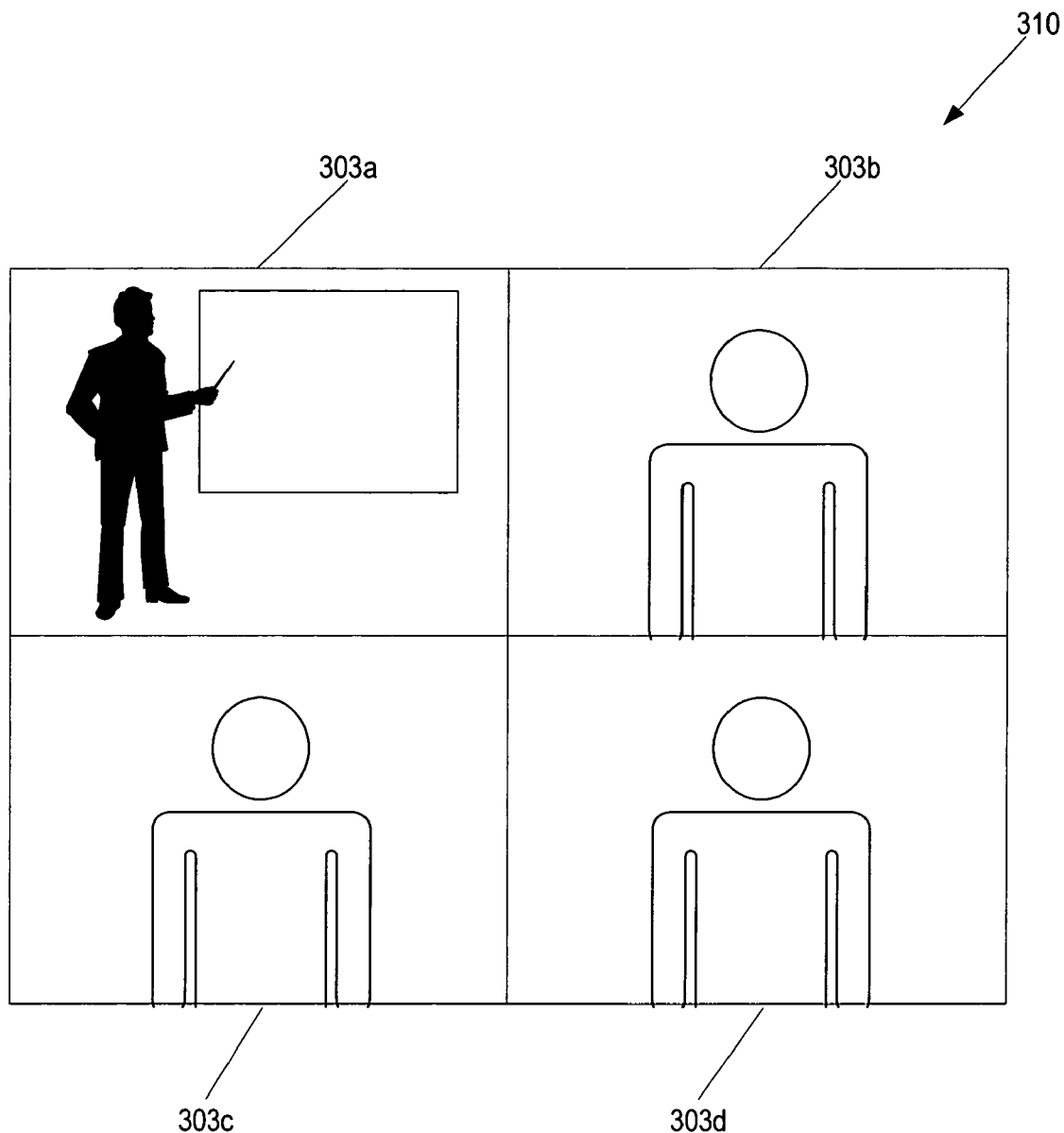
FIG. 3 illustrates a continuous presence screen showing multiple video conferencing sites, according to an embodiment.

FIG. 3 illustrates a video conferencing system displaying multiple participants, according to an embodiment. In some embodiments, it may be desirable to make a video call with more than two conference sites through network 105. For example a 3-way or 4-way or even a 16-way video call may be desired. Calls with multiple participants may require the additional functionality of an MCU. The MCU may be implemented inside a video conferencing endpoint or as a separate stand-alone piece of equipment.

In various embodiments, a multipoint call may use, for example, a full screen mode (one participant on screen) or continuous presence mode (multiple participants viewed on screen simultaneously) to determine what each of the participants views on their respective screen. For full screen mode, if the video algorithm, data rate, and bit rate are the same for the participants, the correct compressed bit stream may be forwarded to a proper endpoint without even having to be decoded. In continuous presence mode, the video from each participant may be decoded, down-scaled and combined into a multiple image composite (e.g., stacked squares) of multiple participants. This may be a 4-quandrant view, a 9-quadrant or even a 16-quadrant view. Other numbers of views are also contemplated. In some embodiments, each participant may have a different view (e.g., with different resolutions and/or different conference views).

In some embodiments, a screen 310 on a video conferencing system may display other participants in continuous presence mode. For example, participants 303a-303d may be displayed in respective portions of the screen 310. In some embodiments, each of the conference sites may use various video conferencing systems that support different resolutions. For example, participant 303a may have a video conferencing system that uses a resolution of 352×288 (pixels); participant 303b may have a video conferencing system that uses a resolution of 1280×720; participant 303c may have a video conferencing system that uses a resolution of 848×480, and participant 303d may have resolution of 720×576. In some embodiments, each participant's video stream may be coded with different video compression algorithms such at H.261, H263, H.264 (Moving Picture Experts Group (MPEG)-4 Part 10), MPEG-1, MPEG-2, MPEG-4, etc. In some embodiments, each stream may be coded at a different bit rate. Other resolutions, compression algorithms, and bit rates are also contemplated.

In some embodiments, a video conferencing system may provide a transcoding or transformation algorithm and a bit rate algorithm to facilitate the call. In some embodiments, the video conferencing system may also support resolution transcoding to allow the conference call participants to be displayed on each participant's respective screen 310 at up to the highest possible resolution supported by the respective screen. For example, the video conferencing systems may not need to default to the lowest resolution of all of the video conferencing systems participating in the call. If a video conferencing system is capable of displaying the resolutions of the other video conferencing systems, it may display them at the resolution they provide. If a video conferencing system can only display a resolution less than the resolution provided by other video conferencing systems, the video conferencing system with the lower supported display resolution may display the other video conferencing system signals at its lower supported display resolution without forcing the other video conferencing systems to display a lower resolution. In some embodiments, low resolution video conferencing system video signals may be displayed on a high definition (HD) screen of a high resolution system at the low resolution sent by the low resolution video conferencing system while another image on the same high definition screen from a different, higher resolution video conferencing system, may be displayed at the higher resolution substantially simultaneously.

Figure 4A:
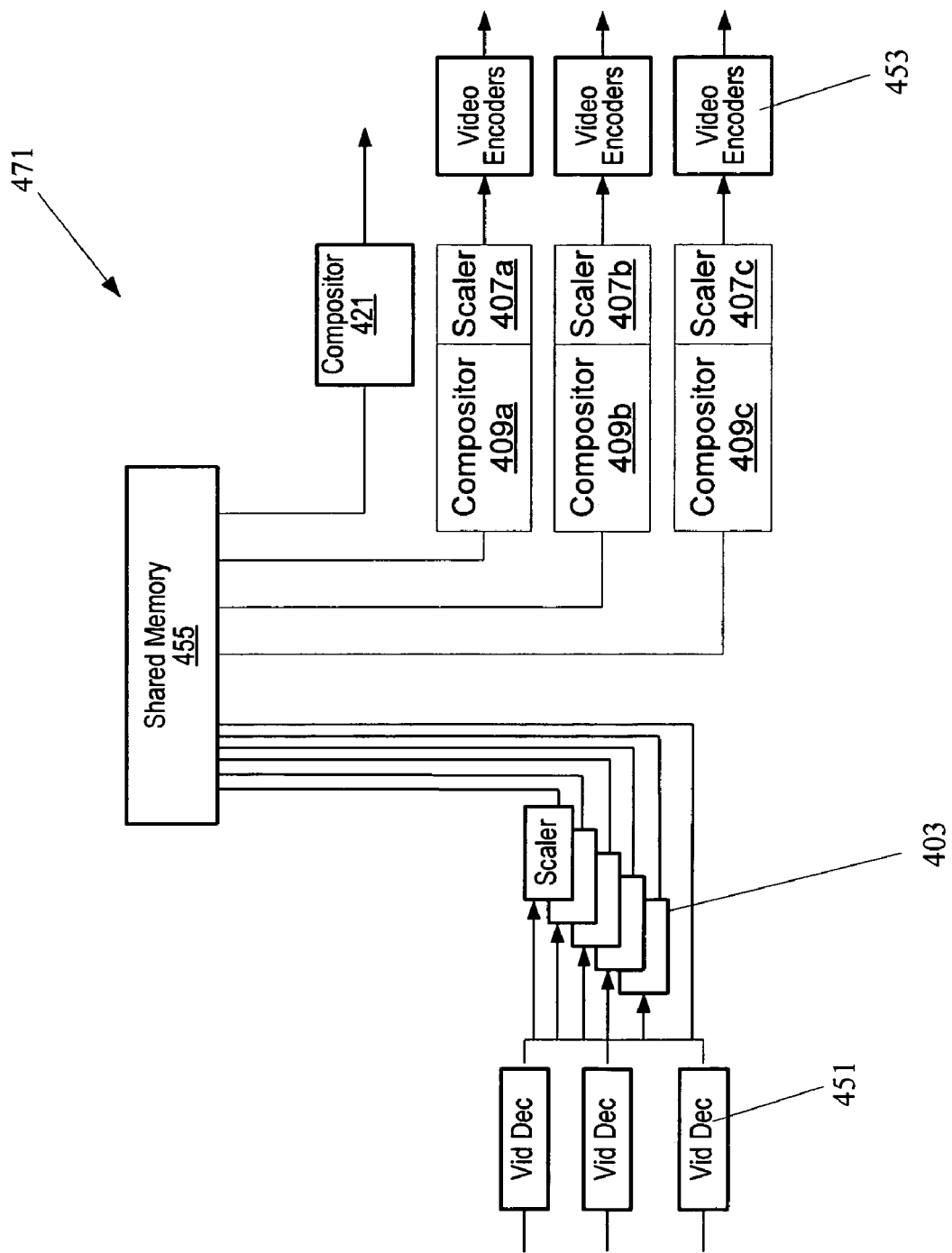
FIGS. 4a and 4b illustrate components for resolution transcoding, according to an embodiment.
Figure 4B:
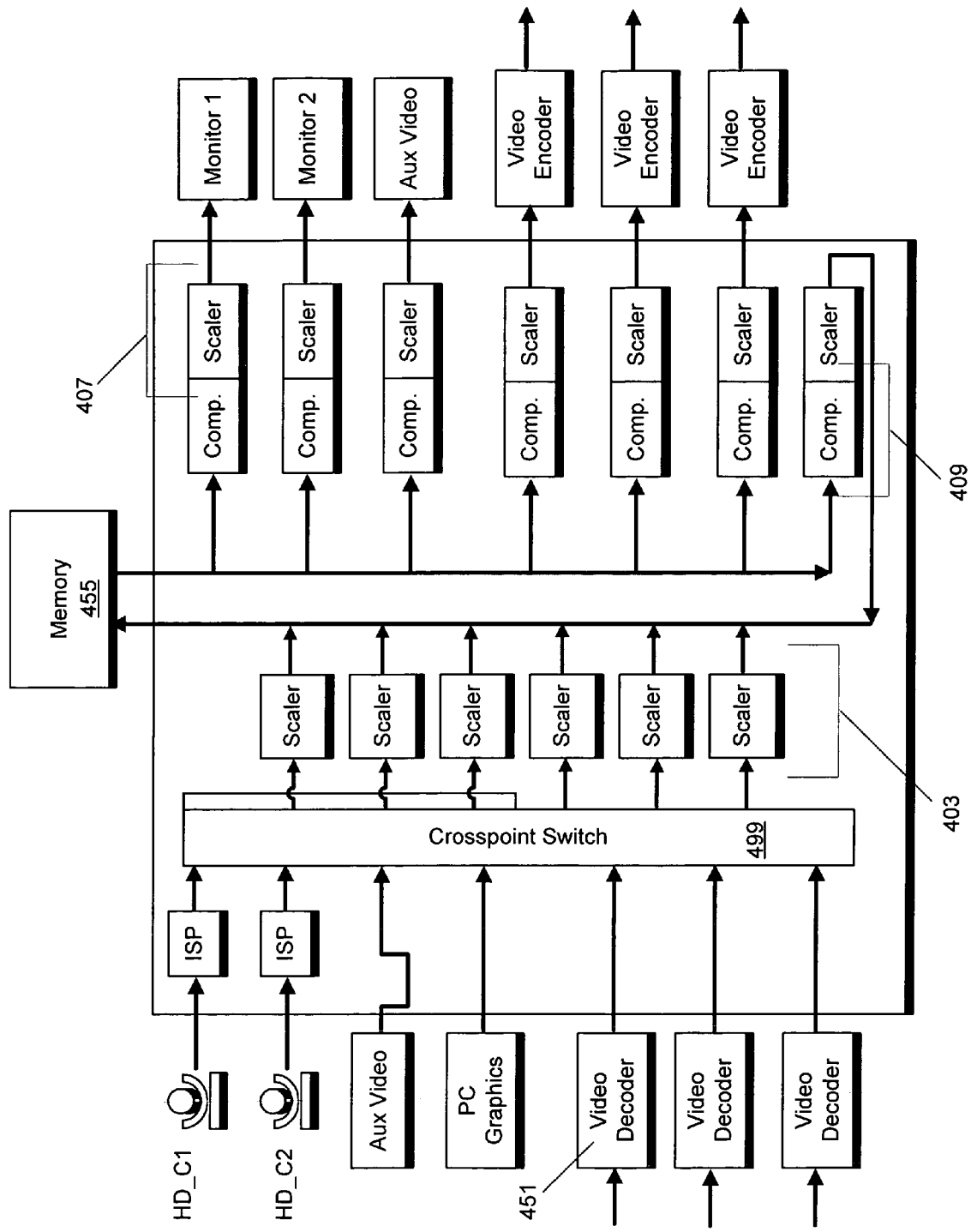

FIGS. 4a and 4b illustrate embodiments of components for resolution transcoding. In some embodiments, a transcoder 471 (e.g., embedded in an MCU) may include a set of scalers 403 coupled to the video decoders 451 (e.g., through crosspoint switch 499 shown in FIG. 4b) receiving video input signals from various video source inputs (e.g., video signals from video conferencing systems participating in a video conference). The scalers 403 may scale the video signals after the video signals are decoded by the decoders 451. In some embodiments, the scalers may be 7-15 tap scalers (other scalers are also contemplated). The scalers may use linear combinations (e.g., with similar or different coefficients) of a plurality of pixels in an image for each pixel scaled. Other scalers are also contemplated. The system may also have scalers 407 coupled to outputs of compositors 409 to scale video being sent to video encoders 453. In some embodiments, the video signal or video data from the video decoders 451 may be scaled (e.g., in scalers 407) prior to being stored in the shared memory 455. In some embodiments, compositors 409 may access the video data (which may have been scaled) from shared memory 455 to form composite images (e.g., a continuous presence screen with view of each incoming video signal to the video decoders 451). The output of the compositors may again be scaled (e.g., by scalers 407) prior to be encoded by video encoders 453. In some embodiments, the video signal received by scalers 407 may be scaled according to the resolution requirements of a video conferencing system coupled to the transcoder 471 prior to being encoded. In some embodiments, the output of a compositor (e.g., compositor 421) may not be scaled prior to leaving the transcoder 471 as a video source output. The components shown in FIGS. 4a and 4b may be in an MCU. In some embodiments, the components may be included in a transcoder 471 embedded in a video conferencing system or other endpoint. Other locations for the components are also contemplated.

In some embodiments, in a full screen mode, if a first video conferencing system creates and can display video signals at a resolution of 1280×720, and a second video conferencing system creates and can display video signals at a resolution of 352×288, the transcoder 471 may scale the first video conferencing system's video signal down from 1280×720 to 352×288 before sending the signal (or a composite including data from the signal) to the second video conferencing system. The second video conferencing system may then receive and display the first video conferencing system's video signal at 352×288 on video screen 331. In this example, the transcoder 471 may scale the second video conferencing system's 352×288 video signal up as required to be displayed on the 1280×720 display. Alternatively, the second video conferencing system's 352×288 video signal may be sent as is (optionally through the transcoder 471) to the video conferencing system, and the lower resolution (352×288) video signal may be handled and displayed appropriately by the high resolution (1280×720) display.

In some embodiments, the first and second video conferencing signals may be composited at an MCU or locally at the video conferencing system. In some embodiments, the video may not be scaled before being sent to the second video conferencing system. In some embodiments, the transcoder 471 may scale the incoming video to output video signals matching the video requirements of each participant video conferencing system.

Figure 5A:
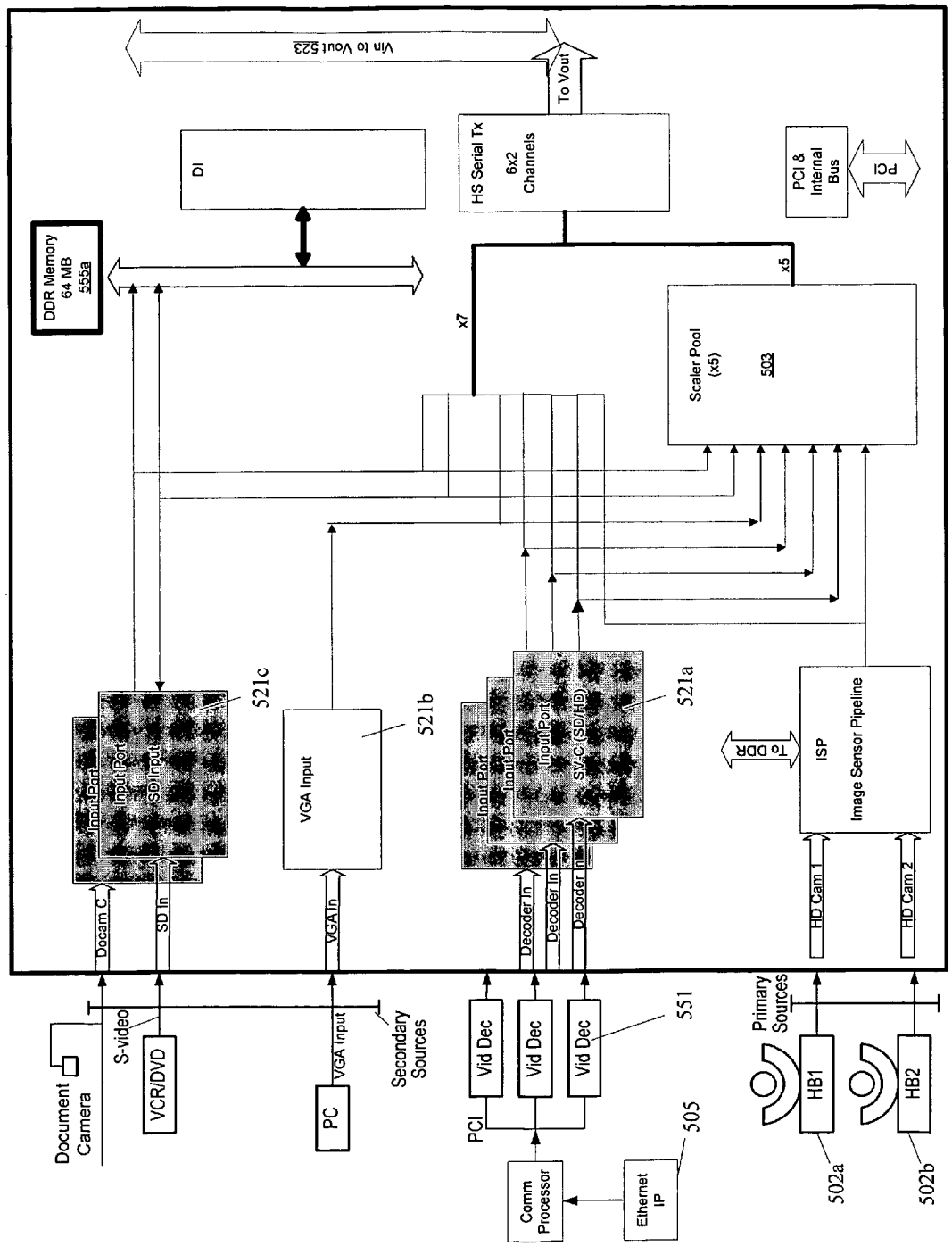
FIGS. 5a-5d illustrate detailed views of components in an MCU and/or video conferencing system, according to an embodiment.
Figure 5B:
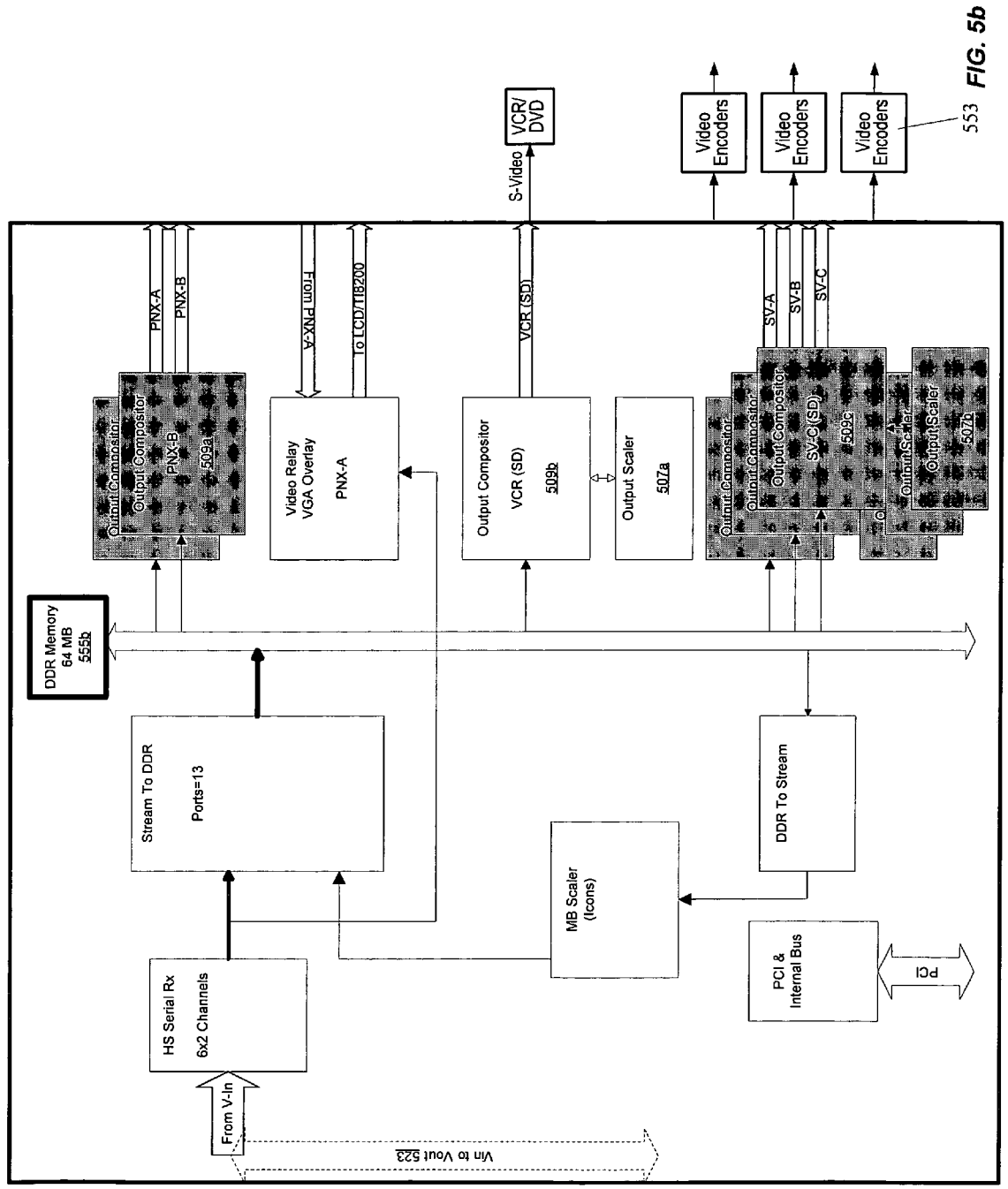
Figure 5C:
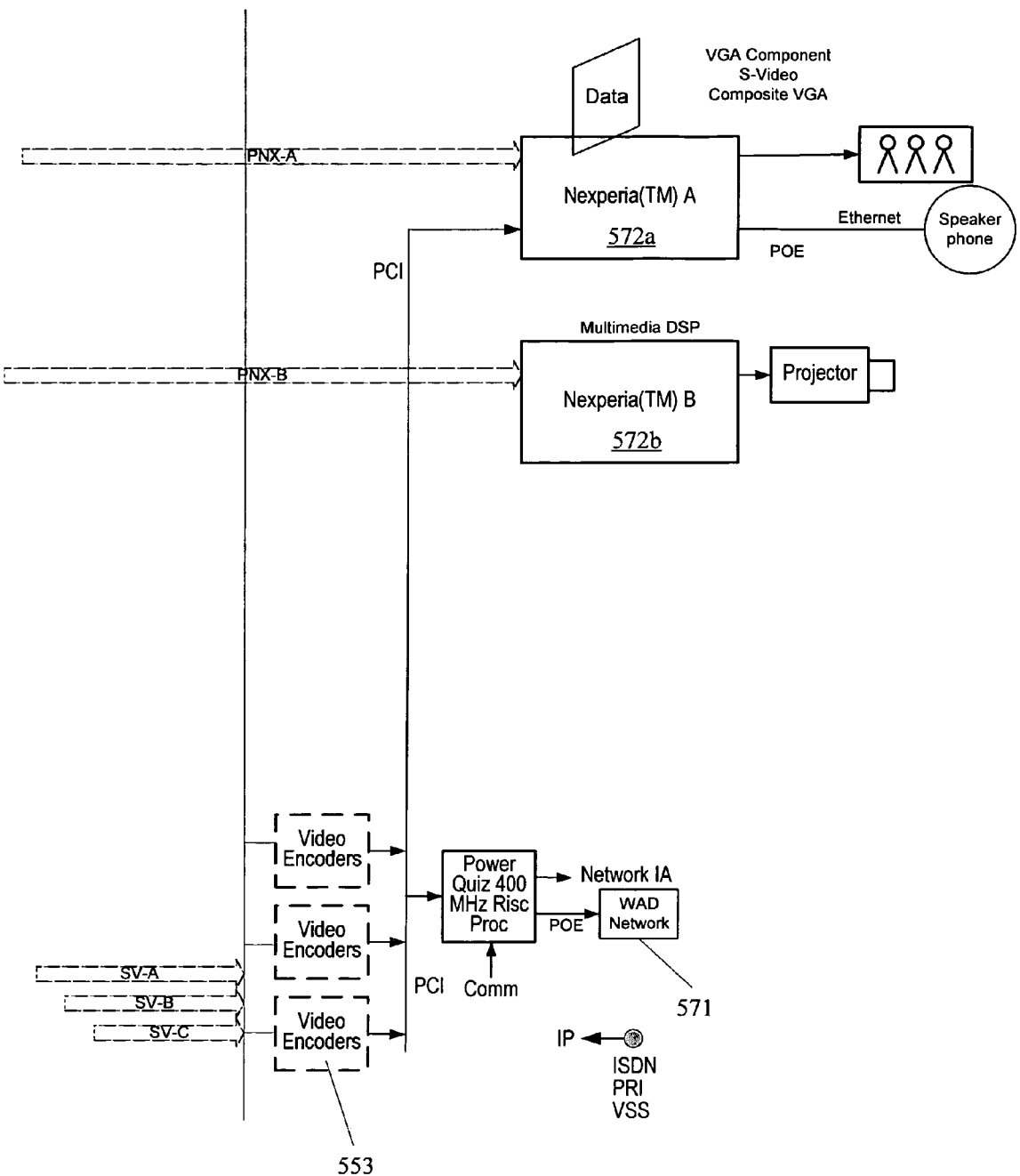
Figure 5D:
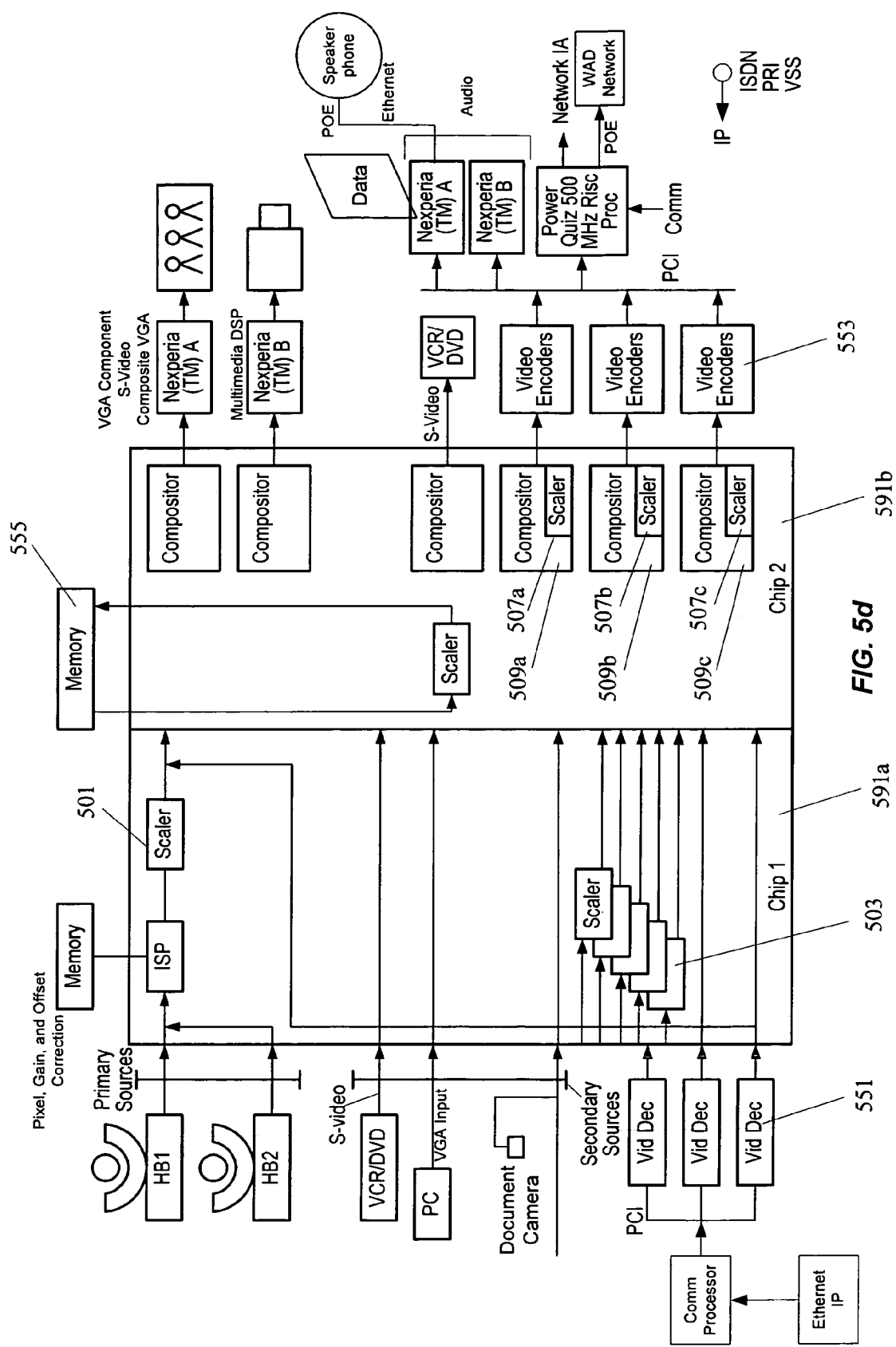

FIGS. 5a-5d illustrate detailed embodiments of components in an MCU and/or video conferencing system. In some embodiments, signals from various sources may be received by the transcoder. For example, signals from cameras 503 (e.g., local cameras on the local video conferencing system) may be received. In some embodiments, signals from endpoints (e.g., remote video conferencing systems) may be received over Ethernet 505. These signals may be received by video decoders 551 to be decoded. Signals may also be from secondary sources such as a Video Graphics Array (VGA) input from a personal computer (PC), a signal from a document camera, or a signal from a Videocassette Recorder (VCR) or Digital Versatile Disc (DVD) player. These signals may be used in, for example, data conferencing. The various input signals may be received at respective input ports 521. The signals may then be received by one or more scalers in a scaler pool 503. The signals may travel on various buses in the MCU (e.g., a peripheral component interconnect (PCI) bus). Signals from the scalers (along with signals that have not been scaled) may be sent to various shared memories 555 (e.g., to 555b through Vin to Vout 523 as seen in FIG. 5b). Compositors 509 may access the shared memory (e.g., shared memory 555b) as needed to form composited signals. For example, the compositors 509c may access multiple video signals, from the video conferencing participants coupled to the MCU, stored in the shared memory 555b for forming a continuous presence image (including each video conferencing participant in their own panel in the image) for display. One or more of the composite images may then be scaled in scalers 507 prior to being encoded by encoders 553 for outputting to the various video conferencing participants. In some embodiments, each output signal may be scaled to the resolution of a specific video conferencing system. As seen in FIG. 5c, the output signals may be encoded and sent to the various video conferencing systems over a network (e.g., a Wide Area Network (WAN) Access Device (WAD) network 571). Multimedia Digital Signal Processing (DSP) processors (e.g., Nexperia™ processors 572) may be used to process audio (e.g., Phillips Nexperia™ (PNX) signals) and/or video signals (e.g., video signals from the PCI bus). FIG. 5d illustrates a transcoder distributed over two interfacing chips 591. Other numbers of chips and/or other arrangements of the components are also contemplated.

Figure 6:
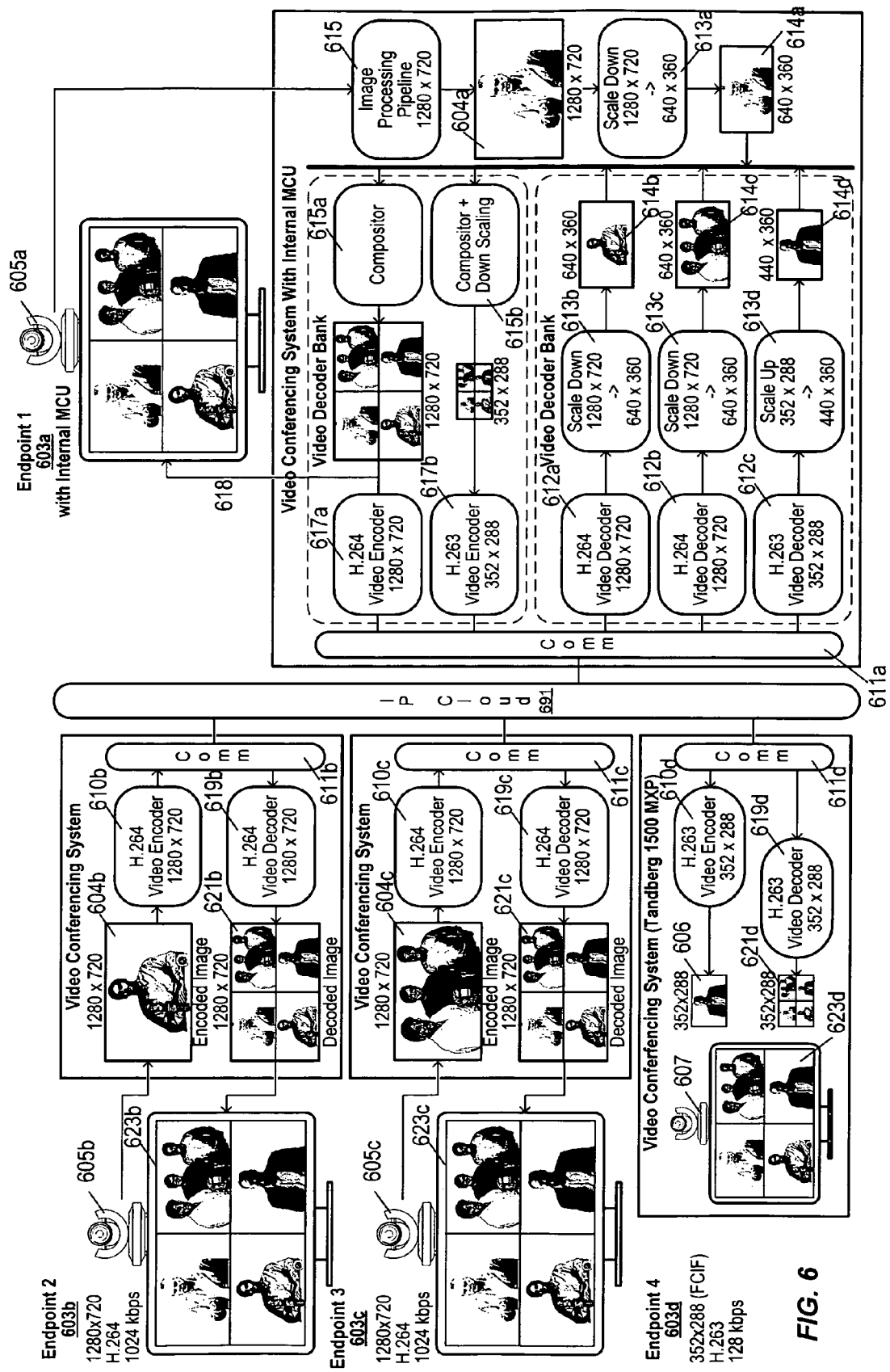
FIG. 6 illustrates resolution transcoding for multiple endpoints, according to an embodiment.

FIG. 6 illustrates an embodiment of resolution transcoding for multiple endpoints. In some embodiments, three remote endpoints 603b-c may be coupled to a local endpoint 603a through an Internet Protocol (IP) cloud 691 network, e.g., the Internet. The video conferencing system endpoints may have different resolution video sources (e.g., high definition cameras 605 producing 1280×720 video 604 versus camera 607 producing 352×288 video 606). Other sources/resolutions are also contemplated.

In some embodiments, each video signal 604 may be encoded through a video encoder (e.g., through a H.264 encoder 610b,c or a H.263 encoder 610d). Other encoders are also contemplated. The encoded signal may then be sent to the MCU through each endpoint's respective communication link 611 (which may include a port and/or communications processor), the IP cloud 691 (such as the Internet), and into the MCU's comm link 611. The respective video signals may then be decoded by appropriate decoders (e.g., H.264 decoders 612a,b and H.263 decoder 612c). Other decoders are also contemplated. The decoded signal may be scaled up or down. For example, the 1280×720 video images may be scaled down to 640×360 images 614b,c (scalers 613b,c) and the 352×288 video image may be scaled up to 440×360 image 614d (scaler 613d). It is noted that other resolutions are also contemplated (e.g., the images may be further scaled up or down). The local image 604a (from camera 605a) may be sent through the image processing pipeline 615 to a scaler 613a to be scaled down to a 640×360 image 614a. In some embodiments, the images may be scaled to fit into a continuous presence screen. Depending on the number of panels in the continuous presence screen, the images may need more or less scaling (e.g., a continuous presence screen with 8 panels (views) may require each view (video image) to be scaled more than a 4 panel screen).

The scaled images 614 may be composited, for example, into a continuous presence screen. A compositor 615 may composite the images 614 into a 1280×720 screen. In some embodiments, the images 614 may be stored on a shared memory accessed by the compositor 615. In some embodiments, the composited image may be further scaled in 615b by a scaler into a 352×288 image. The 1280×720 image may be encoded by an H.264 decoder 617a and sent to endpoints 603b,c. The 1280×720 image may be sent to the local endpoint 603a display (without encoding) at 618. The 352×288 image may be encoded by a H.263 encoder and sent to endpoint 603d The video signal received at each of the H.264 decoders 619b,c at endpoints 603b,c may be decoded into a decoded image 621b,c for display on monitors 623b,c. The video signal received at endpoint 603d may be decoded in the H.263 decoder 619d into decoded image 621d for display on monitor 623d.

In the example of FIG. 6, which involves a continuous presence mode having 4 images displayed in respective quadrants of a display, the 1280×720 video images may be scaled down to 640×360 images 614b,c (scalers 613b,c). The 640×360 images may then be composited and transmitted for display in a respective quadrant of a HD display in the continuous presence mode. The 640×360 images are ¼ the resolution of the original 1280×720 video images and are displayed in a quadrant (¼) of an endpoint's HD display. The 640×360 images may be composited and displayed alongside other one or more images in other quadrants that may originate from lower resolution video cameras. Thus, a HD display in continuous presence mode may display 640×360 images in three quadrants, whereas the fourth quadrant may display an image originating from a FCIF endpoint's non-HD camera (e.g., an image that has been scaled according to FCIF at 352×288) and that has been up-scaled to 440×360.

In prior art systems where at least one camera/image was FCIF, all images were locally scaled to 352×288 and then were down scaled to ¼ that resolution (176×144). These 176×144 video signals were then composited together for a 4-way continuous presence display. Thus, each endpoint would receive four 176×144 resolution images composited together, which may have then been up scaled for display as needed.

In the present system, a non-HD FCIF video signal is not further scaled down in situations where the destination endpoint's display device has a sufficient resolution to display at least 352×288 resolution in a quadrant of the display. Thus, in the above example involving an endpoint having an HD (e.g., 1280×720) display, the HD display will display 3 quadrants each having 640×360 images, and the fourth quadrant will display a 440×360 image, where the 440×360 image has been up scaled from a 352×288 image. In other words, the 352×288 video image may be scaled up to a 440×360 image 614d (scaler 613d), and this scaled up image may be combined (composited) with images (640×360), and the resulting composite image sent to endpoints having an HD display.

Figure 7:
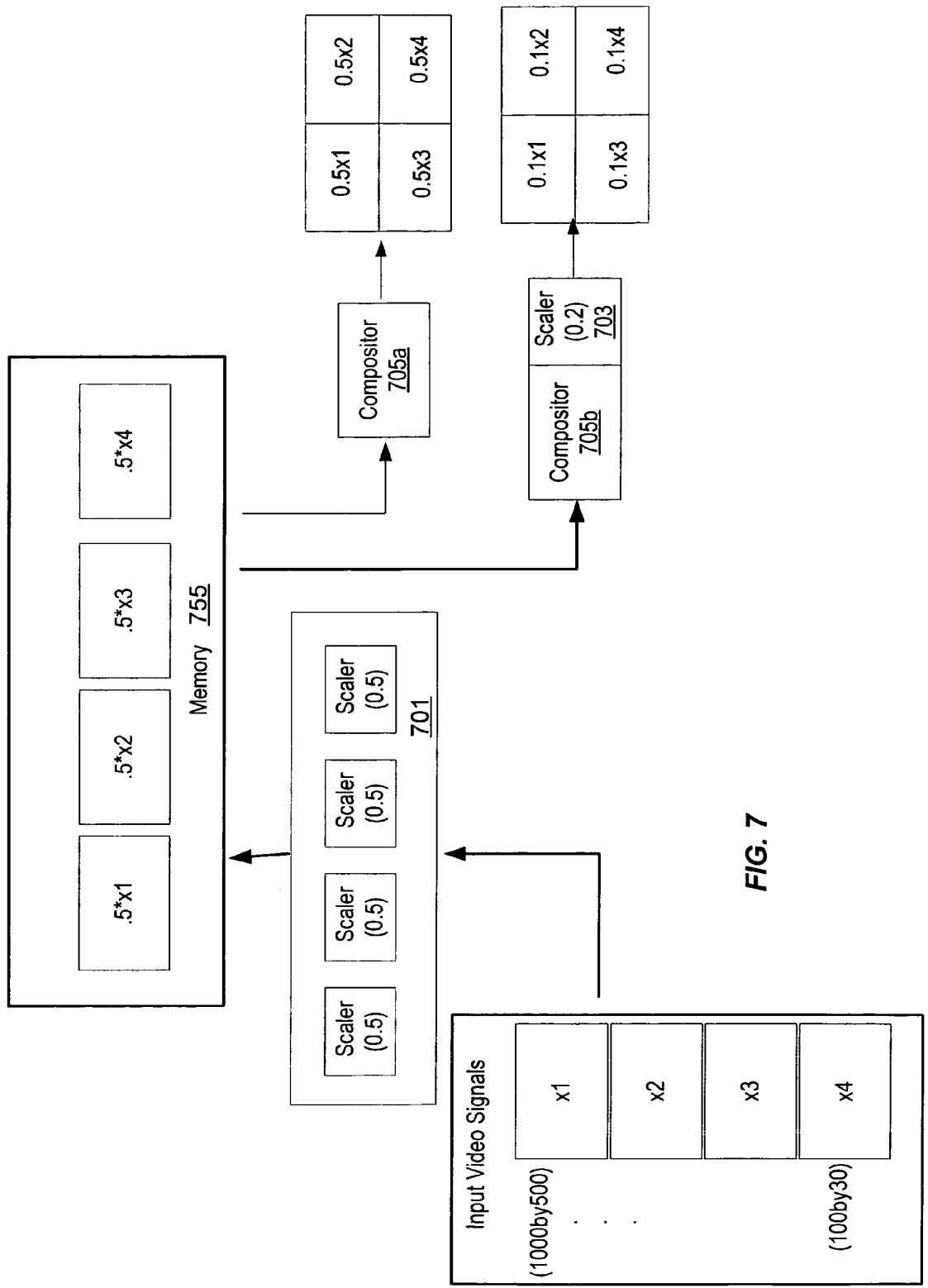
FIG. 7 illustrates video data flow for scalers on both sides of a compositor, according to an embodiment.

FIG. 7 illustrates an embodiment of video data flow including flow between a shared memory 755 and a compositor using two sets of scalers. FIG. 7 illustrates a savings in the required number of scalers when scalers are implemented on both sides of the compositor. For example, an MCU generating a composite image Y comprised of scaled images x1, x2, x3, and x4 (e.g., 0.5*x1+0.5*x2+0.5*x3+0.5*x4) and a composite image Z comprised of different scaled images x1, x2, x3, and x4 (e.g., 0.1*x1+0.1*x2+0.1*x3+0.1*x4) may require 8 scalers and two compositors if the scalers are on only one side of the compositors. However, as shown in FIG. 7, with scalers 701 and 703 on both sides of the compositors (e.g., compositor 705b), composite images Y and Z can be created with only 5 scalers and 2 compositors. For example, image Z may be constructed as Z=0.2*Y. Image Y may be created in part by the scalers on the left (input side) of one of the compositors scaling respective images, which are then stored in shared memory 755 and composited by a respective compositor 705. Image Z may be created by one scaler on the right (output side) of one of the compositors, whereby this one scaler receives the output image Y from the compositor and scales it by a factor of 0.2 to produce the image Z.

Figure 8:
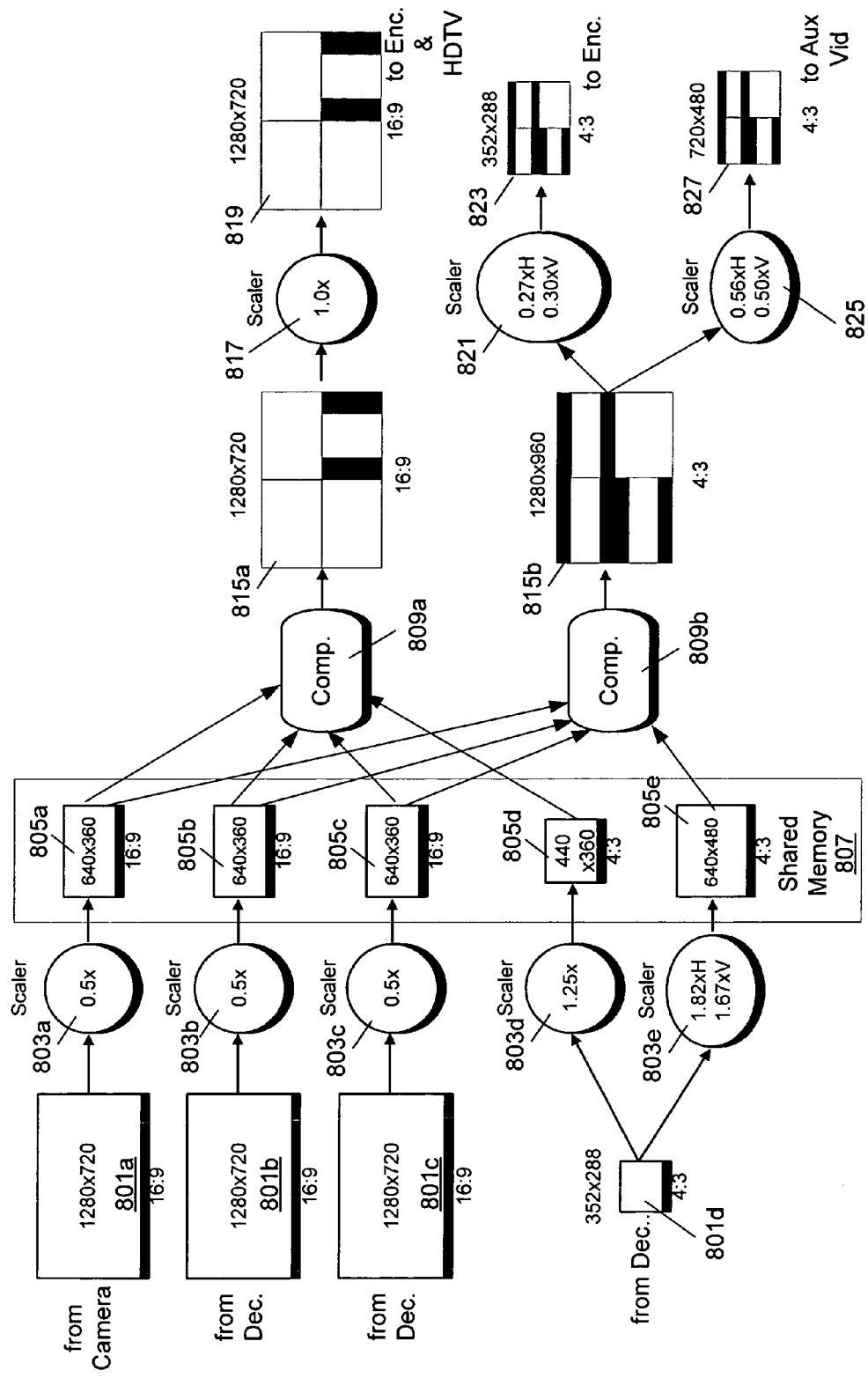
FIG. 8 illustrates a transcoder forming different continuous presence displays for a 16:9 participant and a 4:3 participant.
Figure 9:
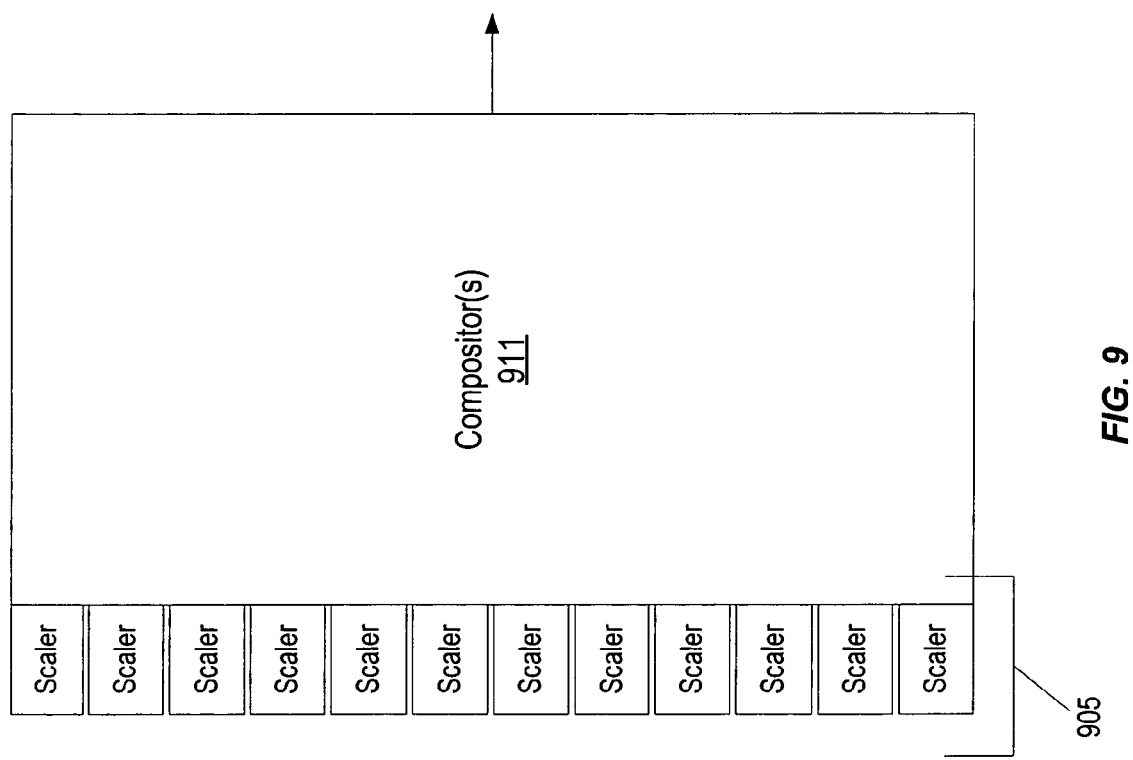
FIG. 9 illustrates multiple scalers on one side of a compositor, according to an embodiment of the invention.

FIG. 8 illustrates a transcoder manipulating various aspect ratios and resolutions to form continuous presence screens for different aspect ratio output screens. A 1280×720 image 801a from a local camera, 1280×720 images 801b,c from decoders, and a 352×288 image (4:3) from a decoder may be scaled by scalers 803 as shown. The scaled images (e.g., 640×360 images 805a,b,c, 440×360 image 805d, and 640×480 image 805e) may be stored on a shared memory 807. Compositors 809 may access the scaled images on the shared memory to form composited images 815a,b. Image 815a may be sent to the encoders and local monitor or may be placed through scaler 817 to produce image 819 for the encoders and local monitor. Image 815b may be scaled by scaler 821 to produce image 823 for the encoder (e.g., to go to a 4:3 remote site). Image 815b may also be scaled by scaler 825 to produce image 827 for an auxiliary video. With only one set of scalers on the left side of a compositor(s), 12 scalers may be required (e.g., see FIG. 9). However, with scalers on both sides of the compositor(s) the same resultant images may be produced with 8 scalers (in some embodiments, other numbers of scalers may be used). In some embodiments, as seen in FIG. 9, images may be transcoded using scalers 905 on one side of the compositor(s) 911. While this may require more scalers, images may be transcoded to needed resolutions for various video conference sites.

In some embodiments, HD resolutions may be defined at the wider 16:9 aspect ratios to be more compatible with movies. In some embodiments, when a system communicates with a 4:3 aspect ratio (Full Common Intermediate Format (FCIF), standard definition (SD), etc.) system and displays a high definition 16:9 ratio image, then the system may display the full image with a non-image border (The entire image can still be displayed even if using a non-image border.) In some embodiments, the system may scale up the image so that the image fills the full 16:9 window (this may result in losing some of the image). In some embodiments, other non linear algorithms may be used that minimize the amount of lost image. In some embodiments, when the system is transmitting to a system with a 4:3 aspect ratio then the system may scale down the 16:9 image. Scaling down the 16:9 image may result in a "letterbox" format with a non-image top and/or bottom area. In some embodiments, various non-linear scaling techniques may be used to reduce or eliminate the non-image areas.

In some embodiments, the wider aspect ratio may work well for video conferencing where there are often many people sitting around a conference table. For example, the wider screen view may allow more of the people around the conference table to be viewed on the screen at the same time. In addition, the systems may have variable interlacing modes such as 1920×1080i (60 540 line fields/sec) or 1280×720 p (60 720 line progressive frames/sec) or 1280×720 30p (30 720 line frames/sec). The 1280×720 resolution may be approximately 10× the resolution of FCIF. Higher resolutions are also contemplated (e.g., approximately 4,000×2000 pixels or more). Various frame rates are also contemplated (e.g., still frame, 5 fps, 10 fps, 15 fps, 30 fps, 60 fps, 120 fps, 240 fps, etc.).

In some embodiments, an H.264 video compression algorithm may be used resulting in approximately two times the compression efficiency of the older H.261 and H.263 algorithms. Use of this new video algorithm may make it possible to provide good quality 1280×720, 30 fps video at rates as low as 768 kbps. Enhancements to H.264 may include High (HP), High 10 (Hi10P), High 4:2:2 (Hi422P), High 4:4:4 (Hi444P). Other coding methods and uncoded data may also be used as the video transport.

In various embodiments, each endpoint may have access to different maximum bandwidths for making video calls. The maximum bandwidth may change depending on time of day, network quality, company policies, etc. Typical video conferencing systems may operate at one of multiple resolutions. If one such system uses FCIF (352×288) at 384 kbs and the same FCIF at 1,544 kbps then the extra bandwidth may provide very little value. In various embodiments, the video conferencing system may support a wide range of intermediate resolutions between 352×288 (FCIF) and 1280×720 or 1920×1080 or higher. In some embodiments, the different resolutions may be supported by the system of scalers as described above.

In various embodiments, the video system may use additional bandwidth to improve the video quality by increasing resolution. The resolution may be adjusted to the available bandwidth for an optimal user experience. In some embodiments, images may be scaled according to the current bandwidth available to a system. For example, even if a system supports an HD resolution, images sent to the system may be scaled to a lower resolution depending on the current bandwidth available to the system. An example of bandwidths and resolutions are:

| Bandwidth | Resolution | Frame Rate | Interlace Mode |
|---|---|---|---|
| 128 kbps | 512 × 288 | 30 | progressive |
| 384 kbps | 848 × 480 | 30 | progressive |
| 512 kbps | 1024 × 576 | 30 | progressive |
| 768 kbps | 1280 × 720 | 30 | progressive |
| 1280 kbps | 1280 × 720 | 30 | progressive |
| 1,544 kbps | 1920 × 1080 | 60 | interlaced |

In various embodiments, with the substantially higher video quality possible on the video conferencing system, video quality may need to be preserved in a multi-way call. In various embodiments, instead of having to re-negotiate all participants down to a lowest common resolution, the MCU embedded in the endpoint described here (although it could also be implemented as a stand-alone MCU) may transcode not just video algorithm, frame rate and bit rate, but also video resolutions, aspect ratios and interlacing modes. Besides the MCU, endpoints may also be configured to scale multiple video resolutions.

In some embodiments, the resolution of the endpoint with the embedded MCU may be lower than the resolution of other participants in the call and their higher resolution may be preserved for these other systems even if the embedded MCU endpoint is scaled to a lower resolution. This may occur when the local display or monitor does not support the higher resolutions of the remote endpoints (other cases are also contemplated).

In some embodiments, endpoints may transmit and receive different video resolutions. For example, when an endpoint has a high resolution camera and is capable of sending a high resolution video signal but has a lower resolution monitor or display, it may, therefore, receive a lower resolution video for display. Commands sent between video conferencing systems and the MCU may inform the MCU as to which resolution (and/or other characteristics such as bit rate) to use for images sent to the video conferencing system.

In some embodiments, an endpoint may transmit a lower resolution (in order to transmit at a lower bit-rate) and receive a higher resolution and higher bit-rate. For example when the endpoint is connected on a asymmetrical network connection such as a digital subscriber line (DSL).

In some embodiments, in a multi-way call with two of the new end-points operating at 1280×720, 30 frames/sec, 16:9 aspect ratio and 768 kbps and a third existing endpoint operating at 352×288, 30 fps, 384 kbps and an aspect ratio of 4:3, an MCU may down scale the 1280×720 16:9 images to a letter boxed 352×288 4:3 image and then re-encode it in the appropriate algorithm for viewing by the FCIF system. Conversely, the 352×288 image may be up scaled and then windowed within 1280×720 and re-encoded in the appropriate algorithm for viewing by the HD systems.

In various embodiments, the system may support two different resolutions each with its own aspect ratio. In some embodiments, the system may support as many different resolutions, aspect ratios, interlacing modes, video algorithms, frame rates and bit rates as there are endpoints in the multi-way call.

Figure 10:
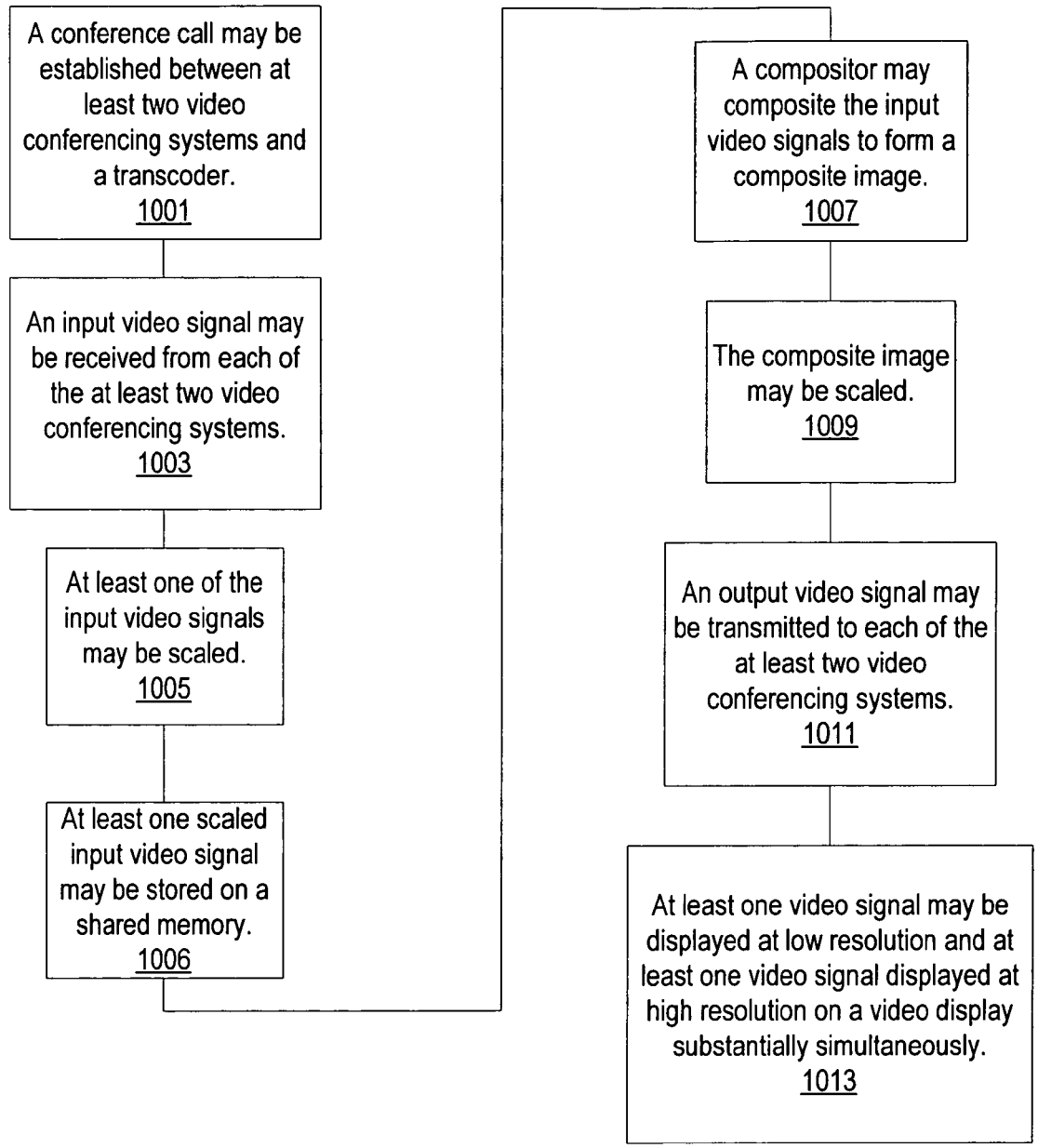
FIG. 10 illustrates a method for transcoding video signals, according to an embodiment.

FIG. 10 illustrates a method for transcoding video conference signals, according to an embodiment. It is noted that in various embodiments one or more of the method elements may be performed concurrently, in a different order, or be omitted. Additional elements may be performed as desired.

At 1001, a conference call may be established between at least two video conferencing systems and a transcoder. In some embodiments, the transcoder may be embedded in an MCU. In some embodiments, at least two of the video conferencing systems may support different video resolutions.

At 1003, an input video signal may be received from each of the at least two video conferencing systems. In some embodiments, the input video signals may be received by the transcoder in the MCU (which may be embedded in one of the video conferencing systems or may be a stand-alone unit).

At 1005, at least one of the input video signals may be scaled. In some embodiments, the scaled input video signals may be placed on a shared memory accessible by a compositor. At 1006, at least one scaled input video signal may be stored on a shared memory.

At 1007, a compositor may composite the input video signals to form a composite image (e.g., a continuous presence image).

At 1009, the composite image may be scaled. In some embodiments, the composite image may not be scaled.

At 1011, an output video signal (e.g., the composite image) may be transmitted to each of the at least two video conferencing systems. In some embodiments, the input video signals and the output video signals may include at least two resolutions.

At 1013, at least one video signal may be displayed at low resolution and at least one video signal displayed at high resolution on a video display substantially simultaneously.

In some embodiments, multiple MCUs may be cascaded together. For example, an MCU may transcode the resolution of a signal being sent to a second MCU. In some embodiments, the second MCU may further scale down or up the signal dependent on the other video conferencing systems coupled to the second MCU. In some embodiments, the second MCU may transcode the video signals being sent to each of its connected video conferencing systems. In some embodiments, the second MCU (and other video conferencing systems) may determine what resolution (and/or other characteristics) it wants to receive images in from the first MCU and may communicate this information to the first MCU. In some embodiments, the information may be entered by a participant or stored in a memory medium accessible to the first MCU. Other ways of determining which resolutions to send are also contemplated. For example, the MCU may output a signal to a video conferencing system or MCU in the same resolution (and/or other characteristics) as the resolution of the signal received by the MCU from that system.

Figure 11:
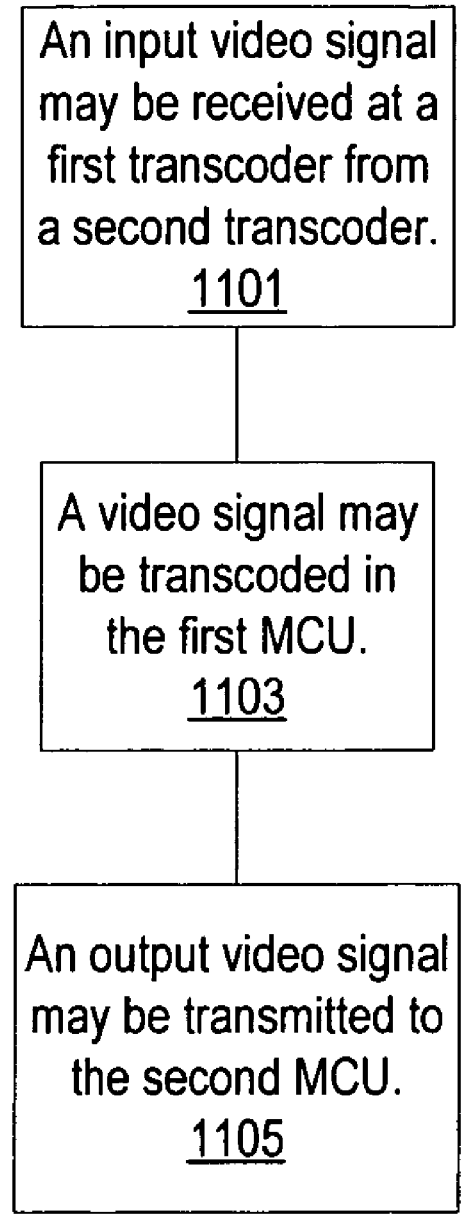
FIG. 11 illustrates a method for transcoding video conference signals for multiple MCUs, according to an embodiment.

FIG. 11 illustrates a method for transcoding video conference signals for multiple cascaded MCUs, according to an embodiment. It is noted that in various embodiments one or more of the method elements may be performed concurrently, in a different order, or be omitted. Additional elements may be performed as desired.

At 1101, an input video signal may be received at a first transcoder (e.g., embedded in a first MCU) from a second transcoder. In some embodiments, the second transcoder may be embedded in a second MCU.

At 1103, a video signal may be transcoded by the first transcoder.

At 1105, an output video signal may be transmitted to the second MCU.

Embodiments of these methods may be implemented by program instructions stored in a memory medium or carrier medium. A memory medium may include any of various types of memory devices or storage devices. The term "memory medium" is intended to include an installation medium, e.g., a Compact Disc Read Only Memory (CD-ROM), floppy disks, or tape device; a computer system memory or random access memory such as Dynamic Random Access Memory (DRAM), Double Data Rate Random Access Memory (DDR RAM), Static Random Access Memory (SRAM), Extended Data Out Random Access Memory (EDO RAM), Rambus Random Access Memory (RAM), etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer that connects to the first computer over a network, such as the Internet. In the latter instance, the second computer may provide program instructions to the first computer for execution. The term "memory medium" may include two or more memory mediums that may reside in different locations, e.g., in different computers that are connected over a network.

In some embodiments, the computer system may include a memory medium(s) on which one or more computer programs or software components according to one embodiment of the present invention may be stored. For example, the memory medium may store one or more programs that are executable to perform the methods described herein. The memory medium may also store operating system software, as well as other software for operation of the computer system.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A transcoder for use in a videoconferencing system, comprising:
   a plurality of video source inputs for receiving video signals, wherein the plurality of video source inputs comprises a first video source input for first receiving video signals corresponding to a first participant of a videoconference, wherein the first video signals are of a first input resolution, wherein the plurality of video source inputs comprises a second video source input for receiving second video signals corresponding to a second participant of the videoconference, and wherein the second video signals are of a second input resolution that is different than the first resolution;
   a plurality of decoders coupled to the video source inputs for decoding the received video signals;
   a first plurality of scalers for scaling the received video signals and scaling the received video signals to produce scaled video signals, wherein the first plurality of scalers comprises a first scaler configured to scale the first video signals to produce first scaled video signals, wherein the first plurality of scalers comprises a second scaler configured to scale the second video signals to produce second scaled video signals, and wherein the first scaled video signals have a resolution that is different from a resolution of the second scaled video signals;
   a memory for storing the scaled video signals;
   one or more compositors coupled to the memory for receiving the first scaled video signals and the second scaled video signals and compositing the first and second scaled video signals to produce a composite image;
   one or more output scalers, each of the one or more output scalers coupled to one of at least a subset of the one or more compositors;
   wherein at least one of the one or more output scalers is operable to scale down a composite image output from one of the plurality of compositors to produce a scaled down composite image; and
   a plurality of video source outputs for providing output composite images, wherein the output composite images comprises the composite image at a first output resolution and the scaled down composite image at a second output resolution that is different from the first output resolution.

2. The transcoder of claim 1,
wherein the first video signals is high definition.

3. The transcoder of claim 1,
wherein the first resolution is 1280×720.

4. A method, comprising:
establishing a conference call between a first video conferencing system, a second video conferencing system, and a transcoder;
receiving a first input video signal from the first video conferencing system and a second input video signal from a second video conferencing system, wherein the first input video signal is of a first resolution, and wherein the second input video signal is of a second resolution that is different from the first resolution;
scaling the first video signal and the second video signal to produce a first scaled video signal and a second scaled video signal, wherein the first scaled video signal has a resolution that is different from a resolution of the second scaled video signal;
compositing the first scaled video signal and the second scaled video signal to produce a composite image;
scaling down the composite image to produce a scaled down composite image; and
transmitting the composite image to the first video conferencing system and the scaled down composite image to the second video conferencing system, wherein the composite image is at a first output resolution, and wherein the scaled down composite image is at a second output resolution that is different from the first output resolution.

5. The method of claim 4, further comprising storing the first scaled video signal and the second scaled video signal on a shared memory.

6. The method of claim 4, wherein the transcoder is embedded in a multipoint conferencing unit (MCU) in at least one of the first video conferencing system or the second video conferencing system.

7. The method of claim 4, further comprising implementing a transcoding algorithm to at least one video signal.

8. The method of claim 4, wherein the transcoder is in a first MCU, and further comprising:
receiving an input video signal from a second transcoder in a second MCU; and
transmitting an output video signal to the second MCU.

9. The method of claim 4, wherein the first input signal is a high definition video signal.

10. A system, comprising:
a first video conferencing system;
a second video conferencing system; and
a transcoder coupling the first video conferencing system and the second video conferencing system;
wherein the transcoder is configured to:
receive first and second input video signals from the first video conferencing system and the second video conferencing system, respectively, wherein the first input video signal is of a first input resolution, wherein the second input video signal is of a second input resolution that is different than the first input resolution;
scale the first input video signal and the second input video signal to produce a first scaled input video signal and a second scaled input video signal, wherein the first scaled video signal has a resolution that is different from a resolution of the second scaled video signal;
composite the first scaled video signal and the second scaled video signal to produce a composite image;
scale down the composite image to produce a scaled down composite image; and
transmit the composite image to the first video conferencing system and the scaled down composite image to the second video conferencing system, wherein the composite image is at a first output resolution, and wherein the scaled down composite image is at a second output resolution that is different from the first output resolution.

11. The system of claim 10, wherein the transcoder is further configured to implement a transcoding algorithm to at least one video signal.

12. The system of claim 10, wherein the transcoder is further configured to implement a bit rate algorithm to at least one video signal.

13. The system of claim 10, wherein the transcoder is embedded in a multipoint conferencing unit (MCU) at one of the first video conferencing systems and the second video conferencing system.

* * * * *